United States Patent
Tanakamaru et al.

(10) Patent No.: US 11,614,865 B2
(45) Date of Patent: Mar. 28, 2023

(54) CONTROLLING SSD PERFORMANCE BY THE NUMBER OF ACTIVE MEMORY DIES

(71) Applicant: SEAGATE TECHNOLOGY LLC, Fremont, CA (US)

(72) Inventors: Shuhei Tanakamaru, San Jose, CA (US); Dana Lynn Simonson, Owatonna, MN (US); Erich Franz Haratsch, Palo Alto, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/724,053

(22) Filed: Apr. 19, 2022

(65) Prior Publication Data

US 2022/0236876 A1    Jul. 28, 2022

Related U.S. Application Data

(62) Division of application No. 16/983,992, filed on Aug. 3, 2020, now Pat. No. 11,347,394.

(51) Int. Cl.
  *G06F 3/06*     (2006.01)
  *G06F 9/48*     (2006.01)

(52) U.S. Cl.
  CPC ......... *G06F 3/0604* (2013.01); *G06F 3/0653* (2013.01); *G06F 3/0679* (2013.01); *G06F 9/4881* (2013.01)

(58) Field of Classification Search
  CPC ..... G06F 3/0604; G06F 3/0653; G06F 9/4881
  See application file for complete search history.

(56) References Cited

U.S. PATENT DOCUMENTS

| | | |
|---|---|---|
| 8,751,700 B2 | 6/2014 | Asnaashari et al. |
| 8,862,806 B2 | 10/2014 | Yoon et al. |
| 8,862,807 B2 | 10/2014 | Yoon et al. |
| 9,092,146 B2 | 7/2015 | Jayaraman et al. |
| 9,348,521 B2 | 5/2016 | Yoon et al. |
| 9,501,069 B2 | 11/2016 | Bickelman et al. |
| 9,575,664 B2 | 2/2017 | Chen et al. |
| 2009/0327780 A1 | 12/2009 | Dawkins et al. |
| 2015/0032948 A1 | 1/2015 | Toon et al. |
| 2015/0220278 A1 | 8/2015 | Sarcone et al. |
| 2015/0326481 A1 | 11/2015 | Rector |
| 2016/0117105 A1 | 4/2016 | Thangaraj et al. |
| 2016/0188223 A1 | 6/2016 | Camp et al. |
| 2017/0300263 A1 | 10/2017 | Helmick |
| 2018/0059933 A1 | 3/2018 | Helmick et al. |
| 2018/0173464 A1 | 6/2018 | Wongso et al. |
| 2019/0073139 A1 | 3/2019 | Kim et al. |
| 2020/0210104 A1 | 7/2020 | Grosz et al. |

(Continued)

*Primary Examiner* — David E Martinez
(74) *Attorney, Agent, or Firm* — Holzer Patel Drennan

(57) ABSTRACT

Improving performance in solid state devices (SSDs) by controlling or throttling the depth of the request queue. In one implementation, a method includes monitoring a request queue in a solid state device (an SSD), the request queue comprising a first request and a second request having an actual time interval therebetween, determining a number of active memory dies of the SSD, determining a target interval based on the number of active memory dies and a target number of active memory dies, and responsive to the actual time interval being less than the target interval, delaying acting on the second request until after the target interval.

19 Claims, 5 Drawing Sheets

(56) References Cited

U.S. PATENT DOCUMENTS

| | | |
|---|---|---|
| 2021/0096755 A1 | 4/2021 | Rajgopal et al. |
| 2021/0303211 A1* | 9/2021 | Moon .................. G06F 3/0679 |
| 2022/0019501 A1* | 1/2022 | Zhou ..................... G06F 3/0679 |

* cited by examiner

CONTROLLING SSD PERFORMANCE BY THE NUMBER OF ACTIVE MEMORY DIES

CROSS REFERENCE

This application is a divisional application of U.S. application Ser. No. 16/983,992 filed Aug. 3, 2020 and entitled CONTROLLING SSD PERFORMANCE BY THE NUMBER OF ACTIVE MEMORY DIES, the entire disclosure of which is incorporated herein by reference for all purposes.

BACKGROUND

Solid state devices or drives (also known as SSDs) are data storage devices that use integrated circuit assemblies, and typically utilize Flash memory protocols.

Whenever there is a read request or a write request to the SSD, the SSD tries to complete the request as soon as possible. At times, the drive is very busy or may be not busy at all, depending on the incoming requests. Because of this, there are performance instabilities, such as IOPS (input/output operations per second) variations and response time variations.

SUMMARY

This disclosure is directed to improving performance instability in solid state devices (SSDs), particularly, decreasing the instability, by controlling or throttling the SSD performance. By improving the performance, the product competitiveness improves.

This disclosure provides, in one particular implementation, a method. The method includes monitoring a request queue in a solid state device (an SSD), the request queue comprising a first request and a second request having an actual time interval therebetween, determining a number of active memory dies in the SSD, determining a target interval based on the number of active memory dies and a target number of active memory dies, and responsive to the actual time interval being less than the target interval, delaying acting on the second request until after the target interval.

In another particular implementation, another method is provided. The method includes monitoring a request queue to a semiconductor storage device (an SSD), the request queue comprising at least a first request, a second request, and an outgoing interval between the requests, and responsive to the outgoing interval being less than a target interval based on a number of active memory dies in the SSD and a target number of active memory dies, setting an actual outgoing interval to be no less than the target interval and acting on the second request after expiration of the target interval.

In another particular implementation, a system is provided. The system includes a solid state device (SSD) and a host, and an interval throttling module stored in memory and implemented by a processor. The interval throttling module is located in a data request completion path of the system and comprises a queue memory unit, a delay unit configured to delay acting on a second request if an outgoing interval between a first request and the second request is less than a target interval, and a calculator unit configured to dynamically adjust the target interval based on a number of active memory dies in the SSD.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTION OF THE DRAWING

The described technology is best understood from the following Detailed Description describing various implementations read in connection with the accompanying drawing.

DETAILED DESCRIPTION

Figure 1:
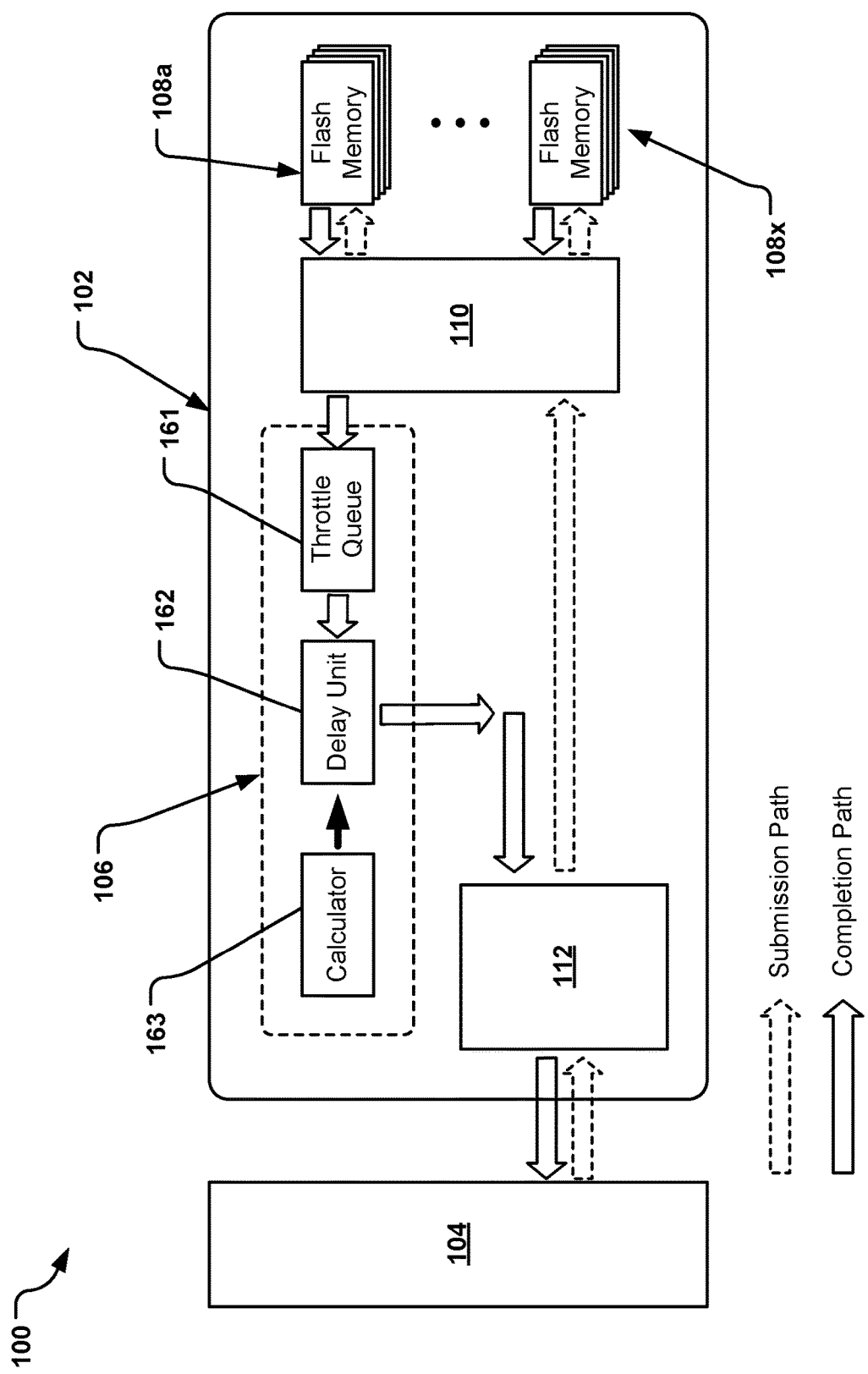
FIG. 1 is a schematic diagram of an example SSD device incorporating an interval throttling module of this disclosure.

An SSD contains multiple NAND flash chips or memories for storing data. Each NAND chip or memory contains one or more dies, and each die contains one or more planes. A plane is divided into blocks, and a block is divided into pages. A page is made up of multiple cells that each hold one or more data bits. Data is written into the pages, at the page level, but erased at the block level.

When there is a read request or a write request to the SSD, the SSD tries to complete the request as soon as possible. At times, the drive is very busy or not busy at all, depending on the incoming requests. The present disclosure provides a methodology to improve the SSD performance by controlling (e.g., throttling) the spacing between requests (the target interval, or T_TargetInterval) in the queue to be acted on based on the number of memory dies that are active in the SSD at that moment. An "active" die is one that is performing a program, performing a read operation, performing an erase operation, performing any other operation, or any combination of the previous.

In general, this disclosure provides schemes for improving SSD performance by controlling the number of NAND Flash memories dies active. A throttling module of this disclosure monitors and controls the interval between the requests via a throttling module that utilizes a control algorithm to determine the number of memory dies that are active in the SSD, then modulates the target interval (T_TargetInterval) between requests based on the number of active memory dies. In some implementations, the number (e.g., average number) of active memory dies is compared to a target number of active dies, so that the actual or average number of active memory dies moves closer to the target number.

In general, the throttling module of this disclosure has three sub-units, a throttle queue unit, a delay unit and a target interval calculator. The queue unit stores the queue of read requests or write requests, or both read and write requests, and may be, e.g., volatile memory, non-volatile memory, or persistent memory. The delay unit receives the request and sends it to be acted on no sooner than after the target interval (T_TargetInterval), which is adjusted based on the number of active memory dies. The calculator calculates (adjusts) the target interval, which is the target time between each request's completion, taking into account the number of active memory dies (e.g., an average number of active memory dies). The T_TargetInterval can be dynamically adjusted to maintain the number of active memory dies at or near a target number.

One specific implementation is to throttle the SSD performance so that the number (e.g., average number) of active memory dies reaches and maintains a target value. The T_TargetInterval calculator receives the number (e.g., average number) of active memory dies, and based on the difference between the number (e.g., average number) and target number of active memory dies, the T_TargetInterval is adjusted to adjust the SSD performance faster or slower.

By setting a minimum time between acting on requests, i.e., the T_TargetInterval, the IOPS can be precisely controlled, resulting in decreased performance variations and significantly improved overall SSD performance. By basing the target interval on an internal parameter such as the number of active memory dies, a more universal and complete control is obtained.

It is noted that throttling does not improve overall performance in the sense of increased speed, but rather, throttling makes the performance more consistent, which is especially desirable in large network (e.g., "Cloud") environments where a service level agreement often requires specific response times. It is performance in this broader sense that is improved, rather than the narrow usage of performance referring to simple throughput.

In the following description, reference is made to the accompanying drawing that forms a part hereof and in which is shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples, including the figures, provided below. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 1 illustrates a system 100 including a solid state drive (SSD) 102 and a host 104, the system 100 including a throttling module 106 incorporated therein, in this particular implementation, in the SSD 102. The SSD 102 has at least one Flash memory 108, here shown as a first memory 108a and another memory 108x. In other implementations, the memory 108 may be PCRAM (phase-change RAM), MRAM (magnetoresistive RAM), STTRAM (spin-transfer torque RAM), FeRAM (ferroelectric RAM), or ReRAM (resistive RAM). It is these memories 108 that contain the memory dies. The SSD 102 also includes a back-end controller 110 and a front-end controller 112. In some implementations, one hardware element or one controller provides the functions of both the back-end controller 110 and the front-end controller 112.

Within the SSD 102 and between the host 104 and the SSD 102 are various data paths, particularly, read/write submission paths shown as dotted arrows and various completion paths shown as solid arrows. Within the SSD 102, the submission and completion paths run between the memories 108, the back-end controller 110 and the front-end controller 112. The submission and completion paths also run within each element (e.g., the host 104, the back-end controller 110 and the front-end controller 112). In the particular system 100 of FIG. 1, the throttling module 106 is positioned between the back-end controller 110 and the front-end controller 112, in the completion path of the read and write requests.

Figure 2:
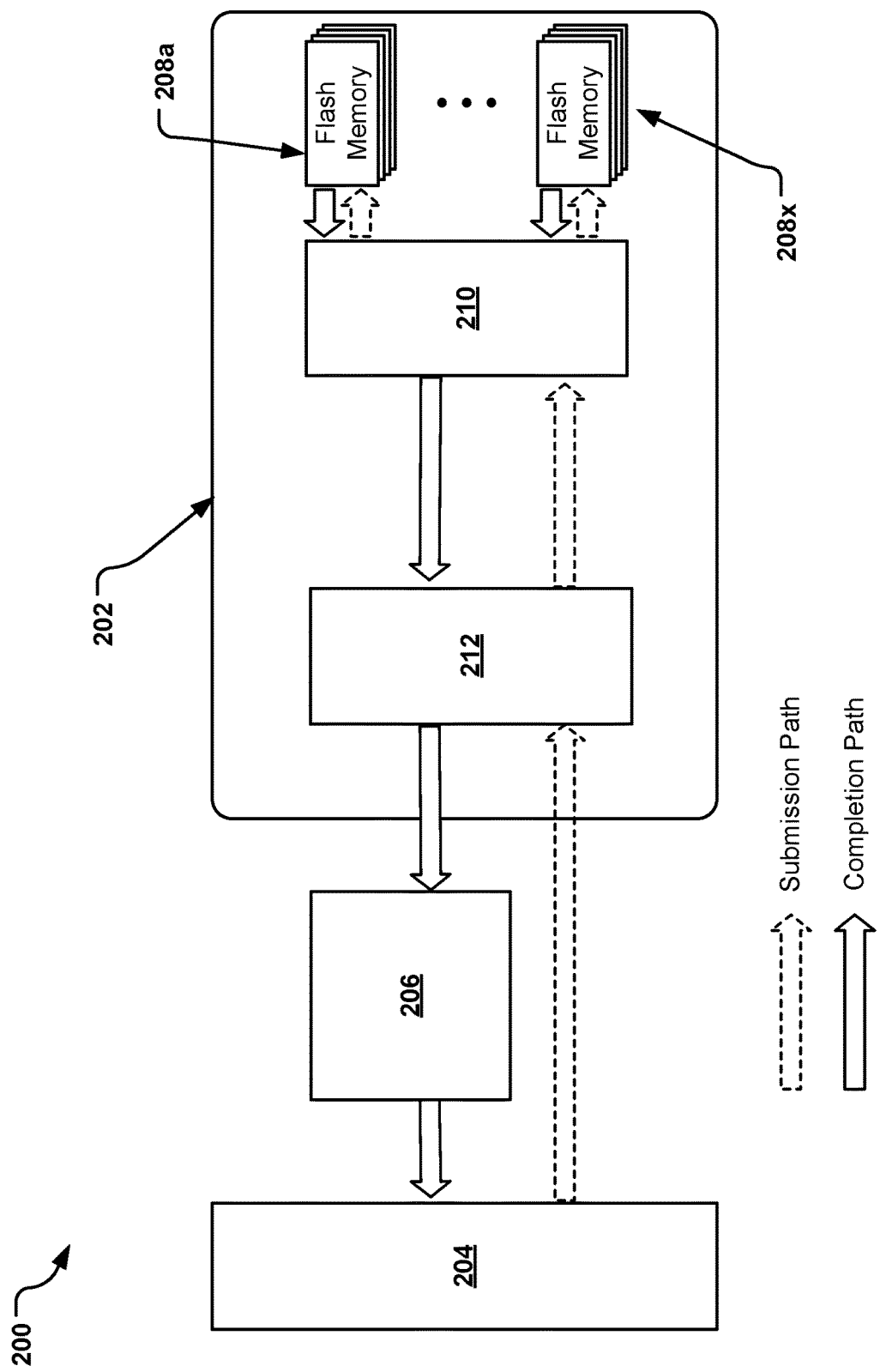
FIG. 2 is a schematic diagram of another example SSD device incorporating an interval throttling module of this disclosure.

In an alternate system 200 shown in FIG. 2, the throttling module is positioned outside of the SSD, between the SSD and the host in a completion path. Particularly, the system 200 has an SSD 202 and a host 204, with a throttling module 206 positioned between the SSD 202 and the host 204. As in the system 100, the SSD 202 has at least one Flash memory 208 (shown as memory 208a and memory 208x), a back-end controller 210 and a front-end controller 212, with appropriate submission paths and completion paths between the various components.

The throttling module can be positioned in any location within the system 100 or system 200, within a data path. Although a completion path is desired, the throttling module could be present in a submission path. As another example, the throttling module can be positioned between Flash memory and the back-end controller.

Returning to FIG. 1, the throttling module 106 includes several sub-modules, including a throttle queue unit 161, a delay unit 162, and a target interval (T_TargetInterval) calculator 163. The queue unit 161 may be, e.g., a volatile memory, non-volatile memory, or persistent memory for storing the request queue. Both the delay unit 162 and the calculator 163 may be implemented as and/or processed as software or other machine-readable instructions. In alternate implementations, the throttling module 106 or any of the units may be implemented in hardware. When implemented as processes in software, the module or units may be provided as executable code which, when run on a device having a processor and computer capability, implement a process or method as described. The module, units or code may be stored on a computer device or may be stored on a memory and may be connected to or downloaded to a computer device.

Although not illustrated, the throttling module 106 also may include any or all of a read/write splitter, a throttling unit which can have a first portion for the read actions and a second portion for the write actions, and a read/write merger.

The throttling module 106, 206 is configured to control the interval between all read and write requests. In alternate implementations, the read requests and write requests are throttled independently.

Figure 3:
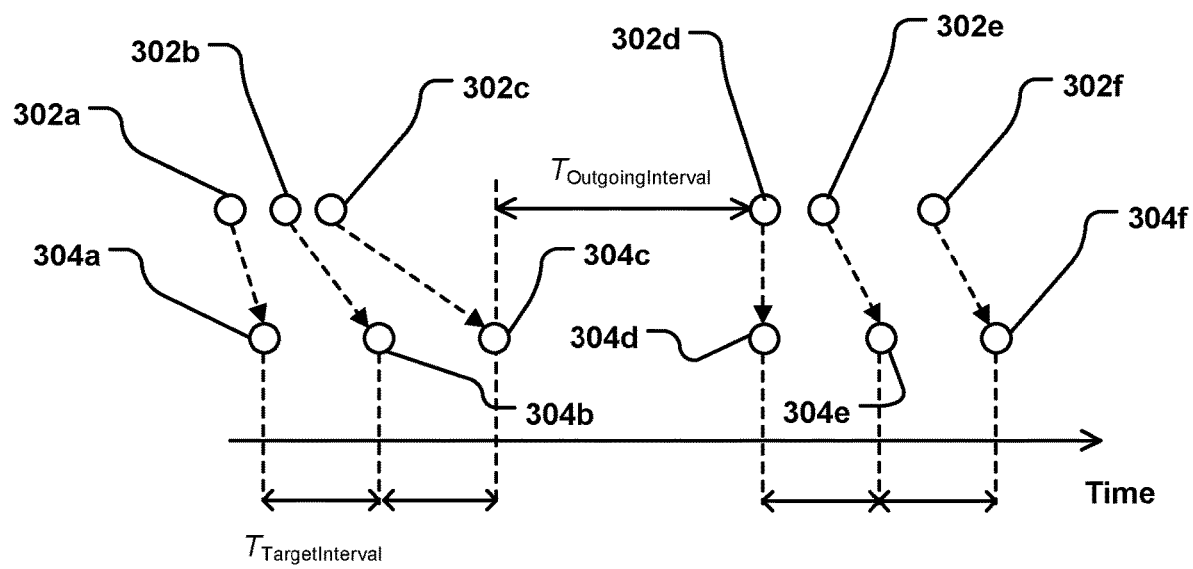
FIG. 3 is a schematic diagram showing an example timing of requests and throttled action on those requests.

FIG. 3 shows an example of spacing out (e.g., throttling) the requests in the queue by delaying acting on the requests, if needed, to obtain a minimum interval (T_TargetInterval) between outgoing requests. These requests may be only read requests, only write requests, or both read and write requests.

A plurality of requests 302, either read requests or write requests, or both, are shown in FIG. 3 as a queue of requests 302a, 302b, 302c, 302d, 302e, 302f that arrive in variable intervals, to be acted on, the intervals shown as T_OutgoingInterval. T_OutgoingInterval, as used herein, is either (1) the elapsed time between the time the last outgoing request was completed and the current time t if the current request is not completed yet, or (2) the actual time interval between two consecutive outgoing requests once both of them are actually completed. The delay unit of the throttling module (e.g., the delay unit 162 of the throttling module 106) rectifies the timing of the queue of the requests 302 (e.g., in the queue unit 161) to the desired interval, T_TargetInterval, as outgoing requests 304. The T_TargetInterval is dynamic, dependent on the number of active memory dies.

Because incoming request 302a is the first sent, the corresponding outgoing request 304a is acted on without delay, essentially immediately. The second incoming request 302b occurs at an actual T_IncomingInterval where the corresponding T_OutgoingInterval will be less than the desired interval T_TargetInterval if this request is acted on immediately upon receipt; thus, the corresponding outgoing request 304b is delayed so that the interval between request 304a and 304b (i.e., T_OutgoingInterval) is T_TargetInterval. Similarly, the third incoming request 302c occurs at an actual T_IncomingInterval where the corresponding T_OutgoingInterval will be less than the desired interval T_TargetInterval if this request is acted on immediately upon receipt; thus, the corresponding outgoing request 304c is delayed so that the interval between request 304b and 304c (i.e., T_OutgoingInterval) is T_TargetInterval. The fourth incoming request 302d has an actual T_OutgoingInterval that is at least, and even more than, the desired interval T_TargetInterval if this request is acted on immediately up receipt; thus, the corresponding outgoing request 304d is completed essentially immediately with no delay. The fifth incoming request 302e occurs at an actual T_IncomingInterval after the fourth request 302d where the corresponding T_OutgoingInterval will be less than the desired interval T_TargetInterval if this request is acted on immediately upon receipt; thus, the corresponding outgoing request 304d is delayed so that the interval between the request 304c and 304d (i.e., T_OutgoingInterval) is T_TargetInterval. The sixth incoming request 302f occurs at an actual T_IncomingInterval after the fifth incoming request 302e that is approximately the same as the desired interval T_TargetInterval; however, because of the delay in acting on the fifth request (i.e., the outgoing request 304e), the corresponding outgoing request 304f is also delayed so that the interval between the outgoing request 304e and the outgoing request 304f is T_TargetInterval.

The particular T_TargetInterval depends on the number of active memory dies and dynamically adjusts with the number of active memory dies. In some implementations, the T_TargetInterval depends on an average number of active memory dies. Also in some implementations, the T_TargetInterval depends on the number of active memory dies (e.g., average number) relative to a target number of active memory dies. For example, as the number of active memory dies becomes higher than a target number of active memory dies, the T_TargetInterval increases, in order to reduce the number of active dies and slow the performance of the SSD. Conversely, to increase the performance, the number of active dies is increased by decreasing the T_TargetInterval. The value for T_TargetInterval may be between, e.g., 1 microsecond and 100 microseconds.

Summarized, the interval between outgoing requests 304 (T_OutgoingInterval) is no less than T_TargetInterval, or, the interval between outgoing requests 304 (T_OutgoingInterval) is T_TargetInterval or greater, with the T_TargetInterval based on the number of active memory dies, which may be an average number, and which may be relative to a target number.

Figure 4:
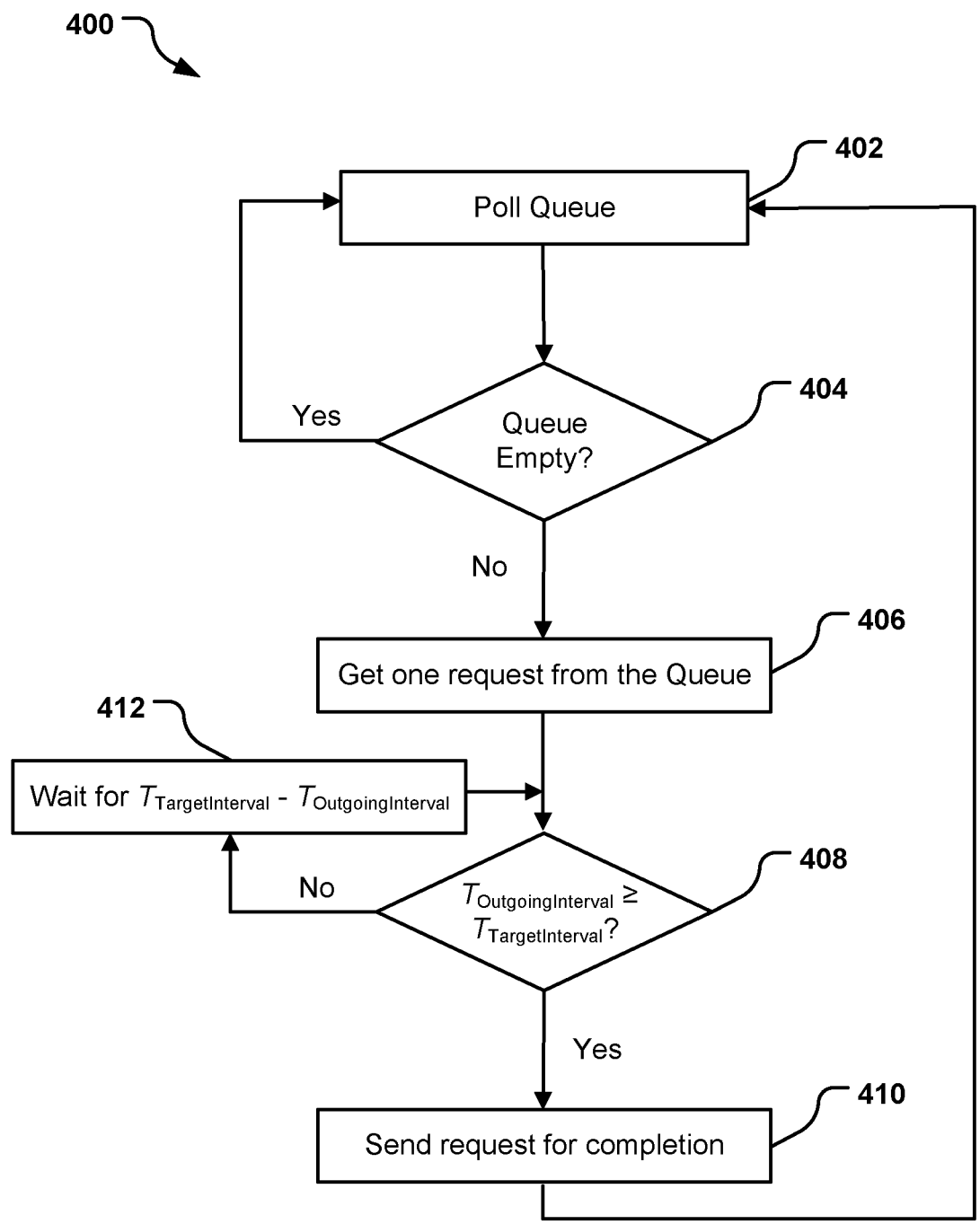
FIG. 4 is an example stepwise method for throttling according to this disclosure.

An overall example methodology of the delay unit (e.g., the delay unit 162) to throttle the requests is shown in FIG. 4 as method 400. In a first step 402, the queue is evaluated, or polled. If the queue is evaluated as empty, in step 404, then the method repeats thus far, returning to the first step 402. If the queue is not empty, the delay unit accepts one request (either a read or write request) from the queue in step 406. The timing of receipt of the request is compared to the time of the previous request in step 408. If the actual interval between the requests (T_OutgoingInterval) is greater than or equal to the target interval (T_TargetInterval), then the request is sent for completion in step 410. If the T_OutgoingInterval is less than the T_TargetInterval, then there is a delay, in step 412, for a duration equal to T_TargetInterval less T_OutgoingInterval. Once the T_TargetInterval time has elapsed (step 408), the request is sent for completion in step 410. In such a manner, the throttling module delays acting on the request, if needed, to obtain at least a minimum time interval between requests of T_TargetInterval.

The T_TargetInterval is dynamically adjusted based on the number of active memory dies, e.g., the average number of active memory dies. An average number of active memory dies may be calculated over a predetermined period of time, which also may be dynamically adjusted.

The T_TargetInterval is dynamically adjusted to obtain and maintain the active number of memory dies at or close to the target number of active memory dies.

Figure 5:
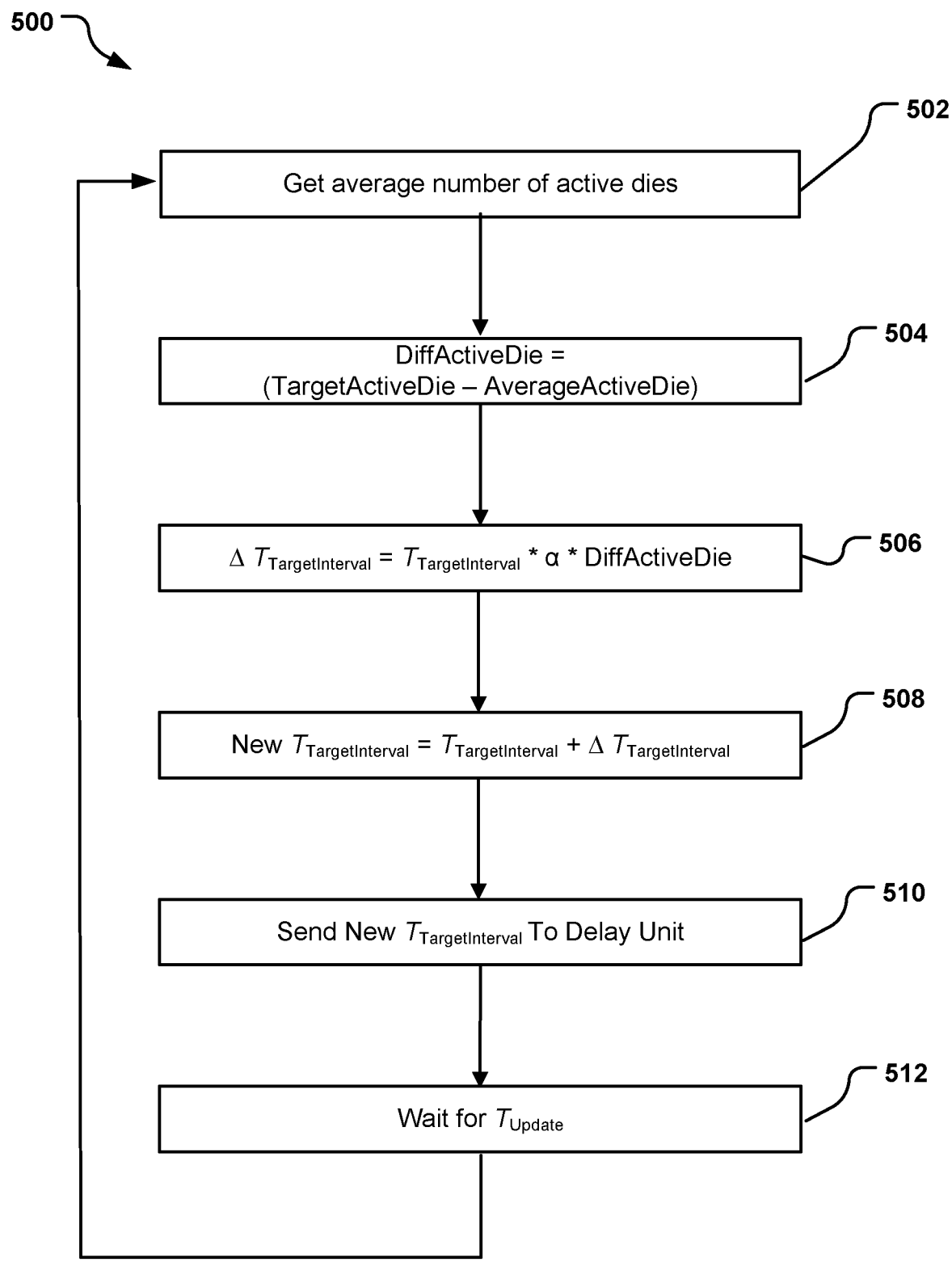
FIG. 5 is an example stepwise method for calculating the delay interval for throttling, based on the number of active dies, according to this disclosure.

An overall example methodology for adjusting the T_TargetInterval based on an average number of active memory dies is shown in FIG. 5 as method 500. It is noted that this is merely one suitable method for adjusting the T_TargetInterval based on the number of active memory dies of the SSD.

In a first step 502, the average number of active memory dies is obtained. This may be any type of average, e.g., an arithmetic mean, moving average, exponential moving average, harmonic mean, quadratic mean, geometric mean, weighted mean, or trimmed or truncated mean. The average number of active memory dies is calculated for a predetermined period of time, e.g., 1 second, 10 seconds; the predetermined period of time may also be adjusted. The calculated or determined average can be updated after a predetermined number of requests or calculations. In some implementations, the average number of active memory dies may be further adjusted based on, e.g., temperature of the SSD, or power usage of the SSD.

After the average number of active memory dies is obtained, the difference in active dies (DiffActiveDie) is calculated in step 504, by subtracting the average number of active memory dies (from step 502) from a target number of active memory dies. The target number may be static or may dynamically change based on, e.g., temperature of the SSD, or power usage of the SSD.

In alternate implementations, a normalized difference of active dies can be calculated rather than the difference (DiffActiveDie) of step 504. This may be done by, e.g., dividing the target number of active memory dies less the average number (from step 502) by the number of total memory dies in the system or SSD.

With the DiffActiveDie, whether normalized or otherwise calculated, the change for the T_TargetInterval is calculated in step 506, as the DiffActiveDie multiplied by the current T_TargetInterval, multiplied by a coefficient α. The coefficient α defines the range of change for the T_TargetInterval per adjustment, and may be, e.g., a percentage. For implementations where DiffActiveDie is merely the difference (as shown in step 504), α is 1, or, 100%. If DiffActiveDie is a normalized value, the coefficient α is less than 1 or 100%. For example, when α is 5%, the change in T_TargetInterval is within 5% of the previous T_TargetInterval. Another example is when α is 1% or 10%. Although α can be any value, it is not desired to move the T_TargetInterval drastically, as drastic changes can provide less precise throttling. Thus, in some implementations, a is no greater than 25%, no greater than 15%, no greater than 10%, or no greater than 5%.

With the change in T_TargetInterval from step 506, the new T_TargetInterval is calculated in step 508. This new T_TargetInterval is transmitted to the delay unit of the throttling module (e.g., delay unit 162 of module 106 in FIG. 1) in step 510 and used to delay, as necessary, the outgoing requests. After the new T_TargetInterval is transmitted, the process waits a time period (T_update) in step 512 before returning to step 502 and determining the next average number of active dies and eventually calculating another new T_TargetInterval. This T_update period can be based on a fixed time, an adjustable time, or other. An example T_update period is 500 microseconds. In an alternate implementation, an update cycle is based on the number of requests or the number of update cycles. For example, an update cycle may occur after 1000 requests.

The throttling modules described herein may be implemented as and/or processed as software or other machine-readable instructions. When implemented as processes in software, the modules may be provided as executable code which, when run on a device having a processor and computer capability, implement a process or method as described. The modules or code may be stored on a computer device or may be stored on a memory and may be connected to or downloaded to a computer device. In alternate implementations, the throttling modules may be implemented in hardware.

In summary, described herein are methodologies for improving the performance of an SSD by throttling the incoming requests by having a minimum time interval between actions, the minimum time interval based on the queue depth of the requests. The throttling is accomplished by a throttling queue module stored in memory of an SSD and implemented by a processor. The throttling module can be configured to throttle read requests, write requests, or both read and write requests.

The above specification and examples provide a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the disclosure or the recited claims.

What is claimed is:

1. A system comprising:
a solid state device (SSD) and a host; and
an interval throttling module stored in memory and implemented by a processor, the interval throttling module located in a data request completion path of the system and comprising:
a queue memory unit,
a delay unit configured to delay acting on a second request if an outgoing interval between a first request and the second request is less than a target interval, and
a calculator unit configured to dynamically adjust the target interval based on a number of active memory dies of the SSD.

2. The system of claim 1, wherein the interval throttling module is located in the SSD.

3. The system of claim 2, wherein the interval throttling module is located between a back-end controller and a front-end controller.

4. The system of claim 2, wherein the interval throttling module is located between a back-end controller and Flash memory.

5. The system of claim 1, wherein the interval throttling module is located between the SSD and the host.

6. The system of claim 1, wherein the interval throttling module further comprises one or more of a read/write splitter, a throttling unit having a first portion for read actions and a second portion for write actions, and a read/write merger.

7. A system comprising:
a solid state device (SSD) and a host; and
an interval throttling module stored in memory and implemented by a processor, the interval throttling module located in a data request completion path of the system and comprising:
a queue memory unit,
a delay unit configured to delay acting on a second request if an outgoing interval between a first request and the second request is less than a target interval, and
a calculator unit configured to dynamically adjust the target interval based on a number of active memory dies of the SSD and a target number of active memory dies of the SSD.

8. The system of claim 7, wherein the calculator is further configured to adjust the target number of active memory dies based on temperature of the SSD.

9. The system of claim 7, wherein the calculator is further configured to adjust the target number of active memory dies based on power usage of the SSD.

10. The system of claim 7, wherein the target number of active memory dies is static.

11. The system of claim 7, wherein the interval throttling module is located in the SSD.

12. The system of claim 11, wherein the interval throttling module is located between a back-end controller and a front-end controller.

13. The system of claim 11, wherein the interval throttling module is located between a back-end controller and Flash memory.

14. The system of claim 7, wherein the interval throttling module is located between the SSD and the host.

15. A system comprising:
a solid state device (SSD) and a host; and
an interval throttling module stored in memory and implemented by a processor, the interval throttling module located in a data request completion path of the system and comprising:
a queue memory unit, and
a delay unit configured to delay acting on a second request if an outgoing interval between a first request and the second request is less than a target interval, the target interval based on a number of active memory dies of the SSD and a target number of active memory dies of the SSD.

16. The system of claim 15 further comprising a calculator unit configured to dynamically adjust the target interval based on a number of active memory dies of the SSD and a target number of active memory dies of the SSD.

17. The system of claim 16, wherein the calculator is further configured to adjust the target number of active memory dies based on temperature of the SSD or on power usage of the SSD.

18. The system of claim 15, wherein the interval throttling module is located in the SSD.

19. The system of claim 15, wherein the interval throttling module is located between the SSD and the host.

* * * * *